United States Patent [19]

Brynemo et al.

[11] 4,114,940
[45] Sep. 19, 1978

[54] SAFETY HOOK

[75] Inventors: Jan Jörgen Brynemo; Tor William Spilhaug, both of Helle, Norway

[73] Assignee: A/S Kjaettingfabriken, Helle, Norway

[21] Appl. No.: 737,030

[22] Filed: Oct. 29, 1976

[30] Foreign Application Priority Data

Oct. 29, 1975 [NO] Norway ................................. 753640

[51] Int. Cl.² ............................................. B66C 1/36
[52] U.S. Cl. .................................... 294/82 R; 24/241; 24/513
[58] Field of Search ................. 294/82 R, 83 R, 78 R; 24/232, 233, 234, 235, 241 R, 241 P, 241 PP, 241 PL, 241 PS, 241 SB, 241 CA, 242; 59/93

[56] References Cited

U.S. PATENT DOCUMENTS

| 926,156 | 6/1909 | Waterhouse | 24/241 PS |
| 1,194,005 | 8/1916 | From | 24/241 PS |
| 4,050,730 | 9/1977 | Tada et al. | 294/82 R |

FOREIGN PATENT DOCUMENTS 2,138,436  2/1972  Fed. Rep. of Germany ........ 294/82 R Primary Examiner—James B. Marbert
Attorney, Agent, or Firm—Watson, Cole, Grindle & Watson

[57] ABSTRACT

A hook provided with a latch adapted to close the hook gap against unintentional removal of a load from the hook, such latch being provided with spring means so cooperating with the latch and hook members as to provide two definite positions of the latch member relatively to the hook member.

6 Claims, 2 Drawing Figures

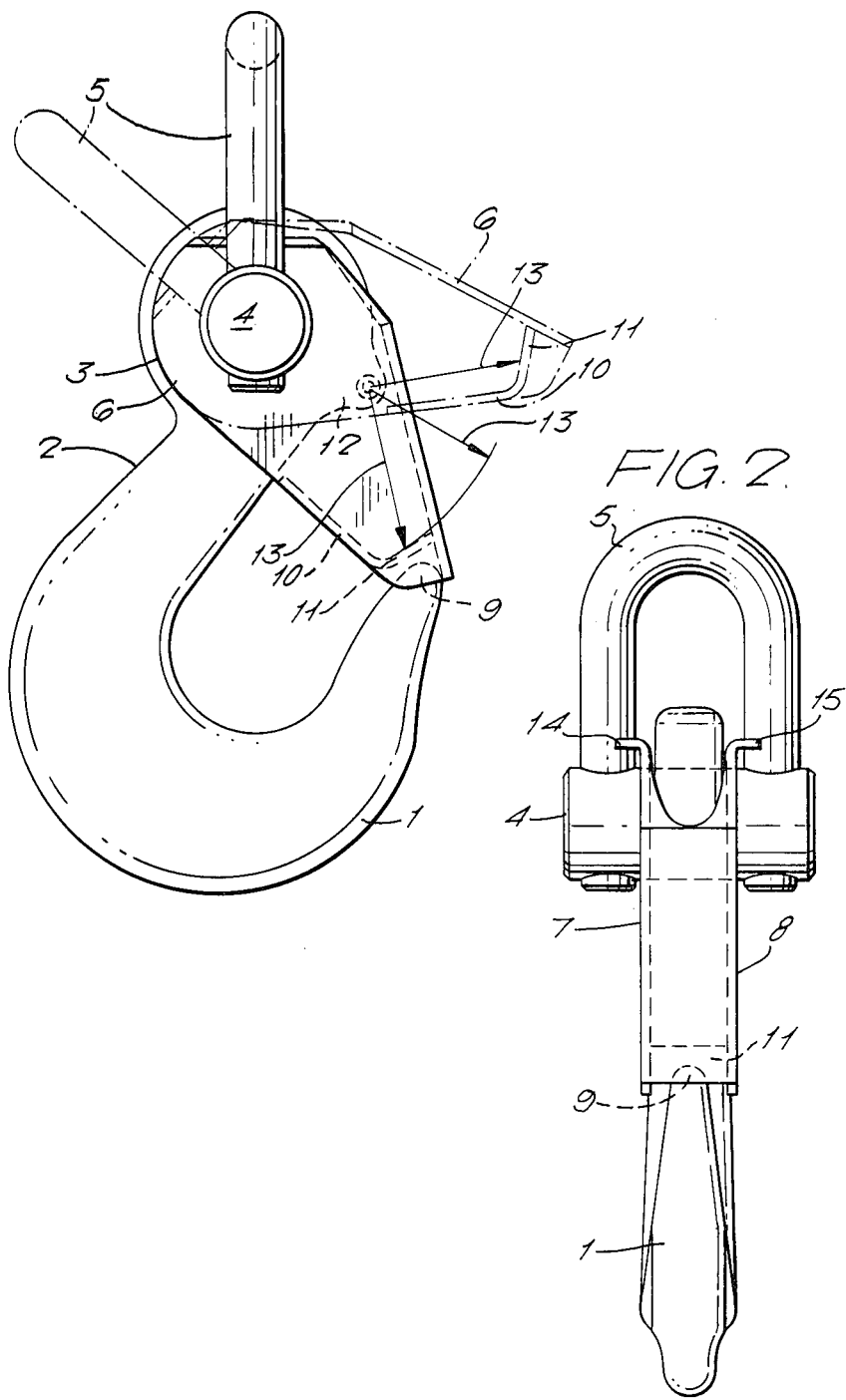

SAFETY HOOK

The present invention relates to a safety hook particularly adapted for lifting and lowering of goods, pulling, anchoring or the like, by means of straps, chains or the like which may be hooked onto the hook, the hook comprising a spring actuated safety latch of substantially U-shaped cross section adapted to close the gap of the hook, to prevent unintentional slipping of the strap, chain link or the like from the hook.

In such hooks a large number of spring actuated safety elements have previously been proposed, with various constructions of the connection between the spring and the element and giving widely varying degrees of safety. From U.S. Pat. No. 3.575.458 a safety hook is known, wherein a spring-biased latch is pivotably mounted externally of the hook shank. The latch opens hook the gap or mouth by pivoting inwardly, and in closed position it is pressed against the inside of the free end of the hook. The latch may be locked in the closed position manually inserting a pin through aligned holes in the latch. Such a pin may also be provided with a manually operated stop element. Thus, this prior art latch is partly manually operated and has no defined open position unless the pin is placed so also bear against the outside of the hook shank.

An object of the present invention is to provide a hook of the type initially mentioned wherein the latch is adapted to provide well defined open and closed positions which hook and latch are simple in manufacture and use, and give perfect safety and can not be put out of function.

Another object of the invention is to provide a safety hook wherein the latch is well suited for cooperation with a shackle connected to a strap, chain or the like used for lifting, lowering, pulling or the like and comprising a portion adapted to engage the legs of the shackle, so as to adapt the position of the letch to the position of the shackle relatively to the hook.

According to the invention, there is provided a safety hook for lifting and lowering of goods, pulling and anchoring or the like, by means of one or more straps, chains or the like provided with an eye, shackle or the like which may be hooked to the hook, comprising a spring actuated latch of substantially U-shaped cross section adapted to close the gap or mouth of the hook, essential inventive features of the hook being that the latch is pivotably mounted on a bolt through the hook eye, so arranged as to be pivotable outward from the hook gap, a partially compressed spring being situated inside the latch bearing at one end against a transverse wall of the latch adjacent the free end thereof, and at the other end against a portion of the hook which in the closing position of the latch, is situated beyond a straight line through the pivot axis of the latch and the bearing point of the spring on the said transverse wall.

Due to such a location of the spring, the latch has two well defined positions, namely an open position and a hook closing position to which the latch will be forced by the spring. During the pivotal movement of the latch between these positions the spring will pass through a position of maximum compression. The spring, which may be a coil spring, is well protected, for example against a chain link in the hook gap.

Preferably, but not necessarily the latch is adapted to cooperate with a shackle or eye, as referred to above. Such shackle connects the hook to a strap, chain or the like, and by providing a pivotal connection between the latch and the shackle, the latch may be arranged to follow pivotal movements of the shackle relatively to the hook, and thus automatically forced into the closing position when the hook and the shackle are subjected to tensional forces, and forced into the open position when the hook in unloaded condition is turned aside relatively to the shackle, in which position a strap or chain may be hooked on or off the hook.

The accompanying drawing schematically and by way of example illustrate an embodiment of a hook according to the invention.

In the drawing,

FIG. 1 is a side view of a hook according to the invention, and

FIG. 2 shows the hook as seen from the right in FIG. 1.

As shown, the safety hook comprises a main body 1 with a neck portion or shank 2 and an eye portion 3 adapted to receive a bolt 4 of a shackle 5. This shackle may preferably but not necessarily be of the type shown in Norwegian Pat. No. 122.214 (or the corresponding British Pat. No. 1.262.418). It is of importance that the hook and the shackle are not easily disconnectable from each other.

The safety latch 6 has a U-shaped cross section, its side wings 7, 8 substantially covering the flanks of the eye 3 and are provided with holes adapted to receive the bolt 4, while the wings 7, 8 at the free end of the latch, are adapted to engage the tip or free end 9 of the hook body 1 from the outside. Inside the latch is provided a wall 10 adjacent the free end which wall closes the opening between the wings 7, 8 in an area which substantially corresponds to the hook gap, and also provides a portion 11 which closes the latch towards the free end of the same. Further the eye 3 is provided with a radially projecting portion 12 which forms a bearing for a coil spring 13, the other end of which is bearing against the transverse wall portion 11 of the latch.

Consequently, when pivoting the latch 6 about the axis of the bolt 4 between the two positions shown in FIG. 1, a strong force is required to compress the spring, as the bearing portion 12 for the spring is closer to the wall portion 11 than the pivot axis of the latch 6.

Further, the latch comprises two flanges 14, 15 each of which is adapted to be interlocked with a leg of the shackle 5, thus causing the latch 6 to follow any pivotal movements of the shackle 6 relatively to the hook.

FIG. 1 shows, in full lines the relative positions of the hook, the shackle and the latch when the hook is loaded, the direction of the shackle being then coincident with a straight line through the axis of the bolt 4 and the bottom of the hook, while the latch 6 is closing the gap in firm engagement with the tip of the hook. In these relative positions it is not possible to open the latch and hook off a strap, as the load causes the shackle and the hook to be locked in the shown relative alignment and the flanges 14, 15 lock the latch 6 relatively to the shackle.

In dotted lines, FIG. 1 shows the relative positions of the shackle 5 and the latch 6, when the hook is in unloaded condition. The hook may then be turned relatively to the shackle end, as the latch 6 and the shackle 5 are interlocked by means of the flanges 14, 15, the latch will adopt a position outside of the hook gap, as shown, thus permitting one or more strap eyes, shackles or the like to be hooked on or off the hook, the relative positions of the hook and the shackle being secured by the spring 13.

Due to the location of the bearing portion 12 of the spring 13, a force must be applied between the shackle and the hook or the latch to compress the spring which, during the pivotal movement of the latch relative to the hook, passes a neutral position in which a straight line can be drawn through the axis of the bolt 4, the bearing portion 12 and the spring 13. Consequently, the latch presents two well defined positions relatively to the hook, with no possibility of accidental swaying between these positions.

Under all circumstances, the spring 13 is well protected and unaccessible within the U-shaped latch 6, within the bottom portion 10 of the same and could only be removed when the shackle 5 has been disconnected from the hook, which means a complete dismantling of the hook unit.

We claim:

1. A load carrying safety hook comprising a hook portion, a body portion provided with a transverse eye, a pin received in said eye for attachment to a shackle member, a latch adapted to close the gap of the hook and having a substantially U-shaped cross section and mounted on said pin for pivotable movement outwardly of the hook gap for opening and closing the same, a compressible spring inserted in said latch to extend from a transverse wall adjacent the free end of said latch to said hook body at a point whereby said spring in the closed position of said latch extends at an angle to a straight line extending through the axis of said pin to the point on said transverse wall of the latch at which one end of said spring is secured.

2. Safety hook as in claim 1, wherein said latch includes two flanges adapted to engage the legs of said shackle mounted on said pin, thereby causing said latch to follow the pivotal movements of said shackle relative to said hook, and thus automatically forced into closing position when said hook and shackle are subjected to tensional forces, and forced into an open position when said hook in an unloaded condition is turned aside relative to said shackle.

3. Safety hook as claimed in claim 2, characterised in that the flanges on the latch engage the shackle on both sides of the same, so as to keep the latch and the shackle interlocked with respect to pivotal movement about the hook eye.

4. Safety hook as claimed in claims 1, characterised in that the latch covers the tip of the hook when in closing position.

5. Safety hook as claimed in claims 1, characterised in that the transverse wall of the latch is provided with a portion which closes the space between the walls of the latch near the free end of the latch.

6. Safety hook as claimed in claim 5, characterised in that an edge of the wall portion is adapted to engage the inside of the hook shank when the latch is in closing position.

* * * * *